No. 680,607. Patented Aug. 13, 1901.
W. LUIS.
BOILER LOCKING LID.
(Application filed Aug. 8, 1899.)
(No Model.) 2 Sheets—Sheet 1.
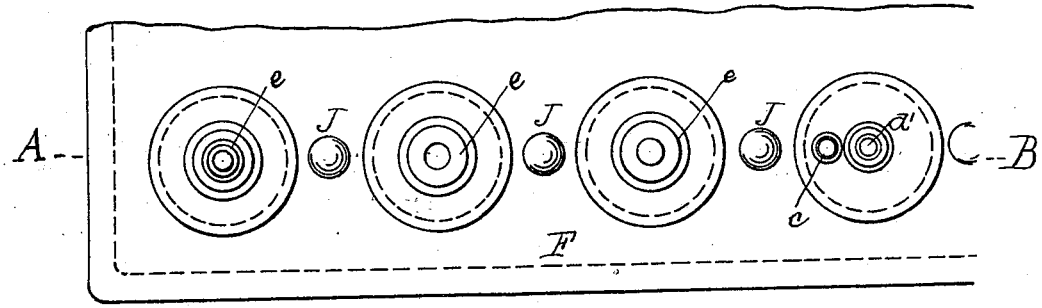
Fig. 1
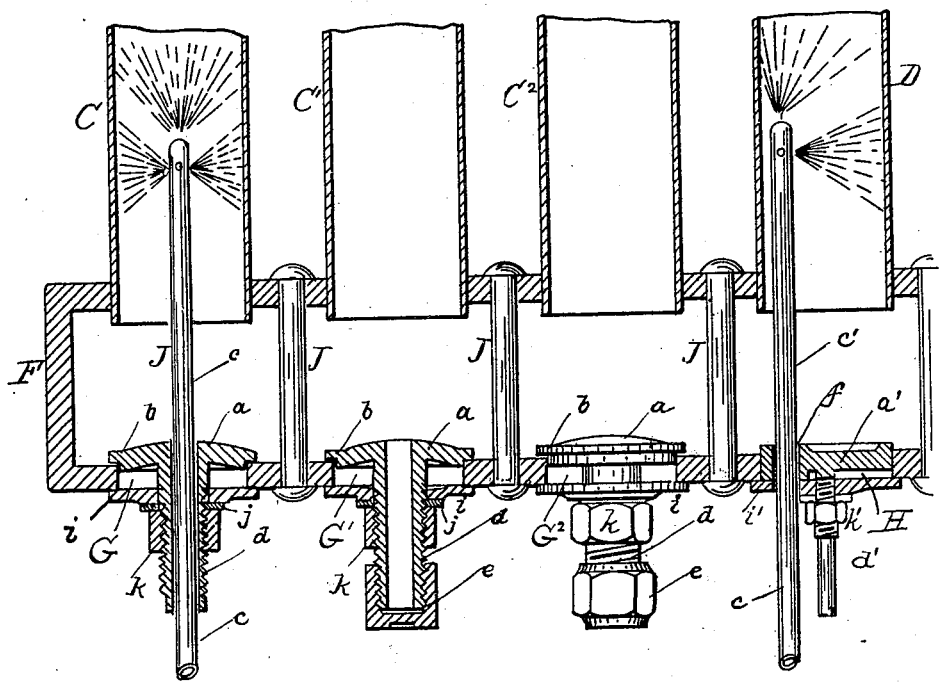
Fig. 1ª
Witnesses:
Jas. W. Richmond
Chas. Nolte
Inventor
Wilhelm Luis
by G. Dittmar
Attorney No. 680,607. Patented Aug. 13, 1901.
W. LUIS.
BOILER LOCKING LID.
(Application filed Aug. 8, 1899.)//
(No Model.) 2 Sheets—Sheet 2.
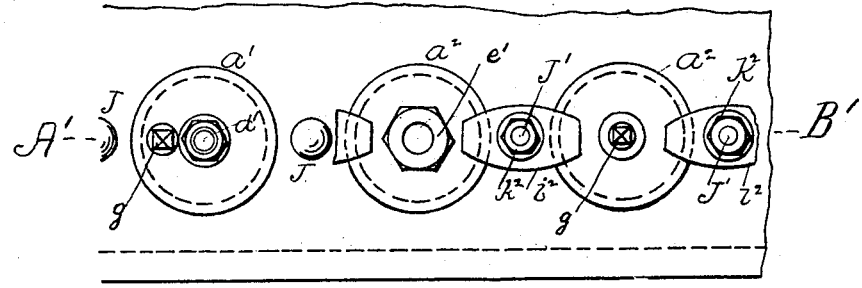
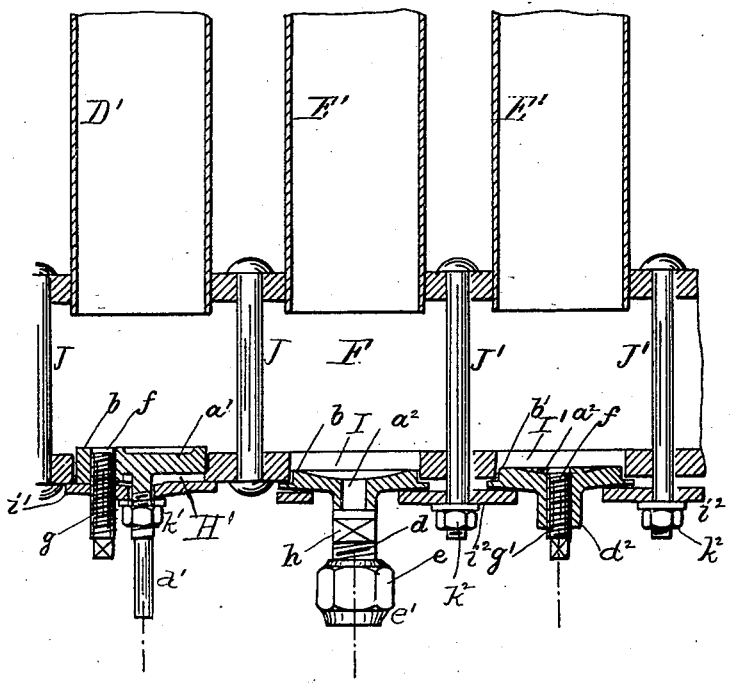
Witnesses:—
Jas. R. Richmond
Chas. Nolk
Inventor
Wilhelm Luis
by G. Dittmar
Attorney

UNITED STATES PATENT OFFICE.

WILHELM LUIS, OF CASSEL, GERMANY.

BOILER-LOCKING LID.

SPECIFICATION forming part of Letters Patent No. 680,607, dated August 13, 1901.

Application filed August 8, 1899. Serial No. 726,572. (No model.)

*To all whom it may concern:*

Be it known that I, WILHELM LUIS, a subject of the King of Prussia, German Emperor, residing at Cölnischestrasse 11, Cassel, Prussia, Germany, have invented Improvements in Boiler-Locking Lids, of which the following is a specification.

This invention relates to locking-lids for manholes or similar apertures in boilers, and has for its object to provide means whereby flush-pipes may be introduced into the water-tubes of boilers for cleaning purposes.

With this object in view the invention consists in the improved construction, arrangement, and combination of parts hereinafter fully described and afterward specifically pointed out in the claims.

In the accompanying drawings, Figure 1 is a view of the part of the outside of a water-box of a boiler supplied with devices constructed in accordance with my invention. Fig. 1$^a$ is a sectional view on the line A B of Fig. 1, partly in elevation. Fig. 2 is a view similar to Fig. 1, showing modified constructions of my invention. Fig. 2$^a$ is a sectional view on the line A' B' of Fig. 2.

Like letters of reference mark the same parts in all of the figures of the drawings.

Referring to the drawings by letters, C C' C$^2$ D D' E E' indicate water-tubes of a boiler, secured in a water-box F in any usual manner, such water-box being provided in its outer wall with manholes G G' G$^2$, H H', and I I' in line with the respective tubes, the water-box being strengthened by suitable brace-rods J J'. The manholes G G' G$^2$ are provided with inner lids $a$, having annular flanges $b$, bearing against the inner edge of the walls of the manholes, and with screw-threaded tubular extensions or clamp-plates $i$, bearing against the outer edges of the walls of the manholes, packing-washers $j$, and nuts $k$ outside of said washers. Flush-pipes $c$ may be introduced through the tubular extensions $d$ into one or more of the water-tubes, and by tightening the nut $k$ the lid may be clamped in position and at the same time the packing expanded to seal the bore of tubular extension $d$ against leakage around the flush-pipe. When the flush-pipe is not in use, the tubular extension $d$ may be closed by a screw-cap $e$, as shown.

In the before-described constructions the tubular extension is concentric with the manhole and water-tube, but it is not absolutely necessary that it be so situated, it being permissible to introduce the flush-pipe in a position eccentric with the holes and tubes. At C', I have shown such an arrangement of the flush-pipe at C' C' in connection with the water-tubes D and manholes H, in which lids $a'$ $a'$ are provided with eccentric openings $f$ for the flush-pipes, concentric solid-threaded extensions $d'$ $d'$, clamp-plates $i'$ $i'$, and nuts $k'$. The opening $f$ may be closed when the flush-pipe is not in use by means of a screw-plug $g$.

Further modifications are shown in connection with water-tubes E E' and manholes I I', in which the lids $a^2$ $a^2$ are on the outside of the manholes and have flanges $b'$ $b'$. bearing against the outer edges of the walls of the manholes. These lids are further provided with concentric tubular extensions $d^2$, having interior threads to receive threaded plugs $g'$ when the flush-pipe is not in use, and the lids are held in position by clamp-plates $i^2$ $i^2$ on the outer projecting ends of brace-rods J' J', held by nuts $k^2$, said plates bearing against the outer faces of the lids. The extension $d^2$ may be threaded on the outside and a screw-cap $e'$ used for closing its aperture, and the lid may be prevented from turning by providing a square portion $h$ to receive a fixed key. (Not shown.)

The construction and operation of my invention will be readily understood from the foregoing description. By it the flush-pipe may be readily entered and removed without removing the lid and the water-tubes quickly and effectually cleaned.

Having thus described my invention, what I claim as new is—

1. In a water-tube boiler, the combination with a water-box having a manhole in its outer wall and a water-tube in its inner wall in line with the manhole, of a lid for the manhole having an opening through which to introduce a flush-pipe through the lid and water-box and into the water-tube, and means for closing the opening in the manhole, substantially as described.

2. The combination in a water-tube boiler having a manhole, and a water-tube in line therewith, of a lid provided with an outwardly-projecting threaded tubular extension through which to introduce a flush-pipe into the water-tube, a clamp-plate on said extension bearing on the outside of the wall of the manhole, a packing-washer on the extension outside of the clamp-plate, a nut on the extension outside of the packing-washer and a screw-cap for closing the end of the extension, substantially as described.

In witness whereof I have hereunto signed my name, this 19th day of July, 1899, in the presence of two subscribing witnesses.

WILHELM LUIS. [L. S.]

Witnesses:
JULIUS LION,
HERMANN LION.